Nov. 14, 1933.  H. S. WALKER ET AL  1,935,069
ROTARY MILLING CUTTER AND LIKE TOOL
Filed May 23, 1931   2 Sheets-Sheet 1
Fig.1.  Fig.2.
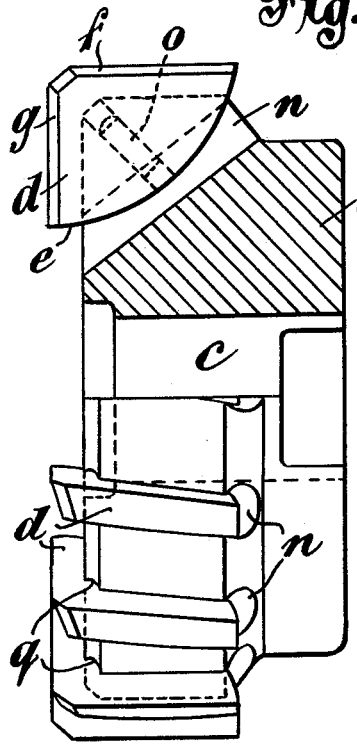
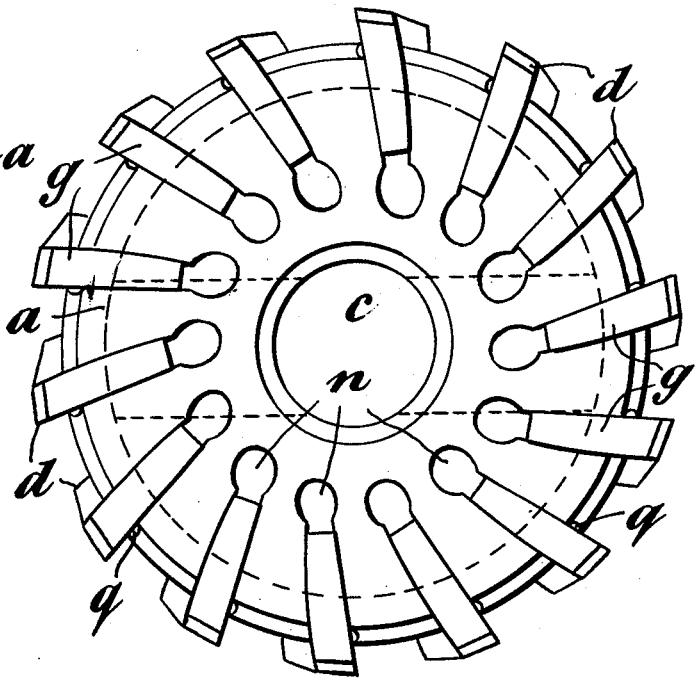
Fig.5.  Fig.6.
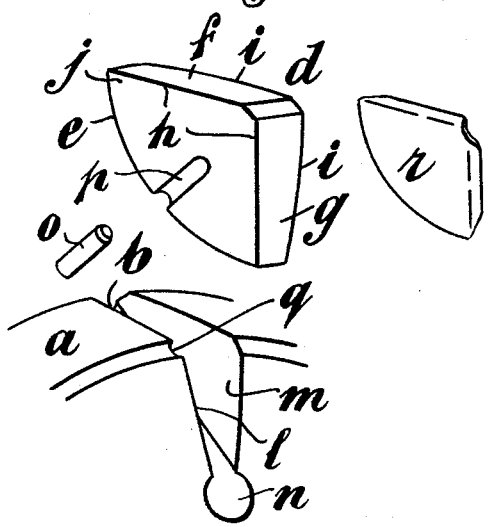
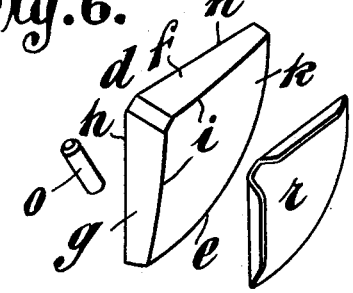
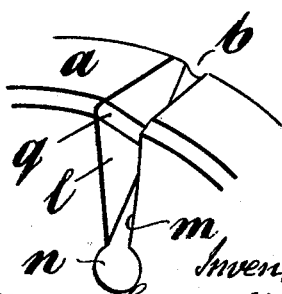
Inventors:
Herbert Stuart Walker
Ralph Miller
By ............... Atty

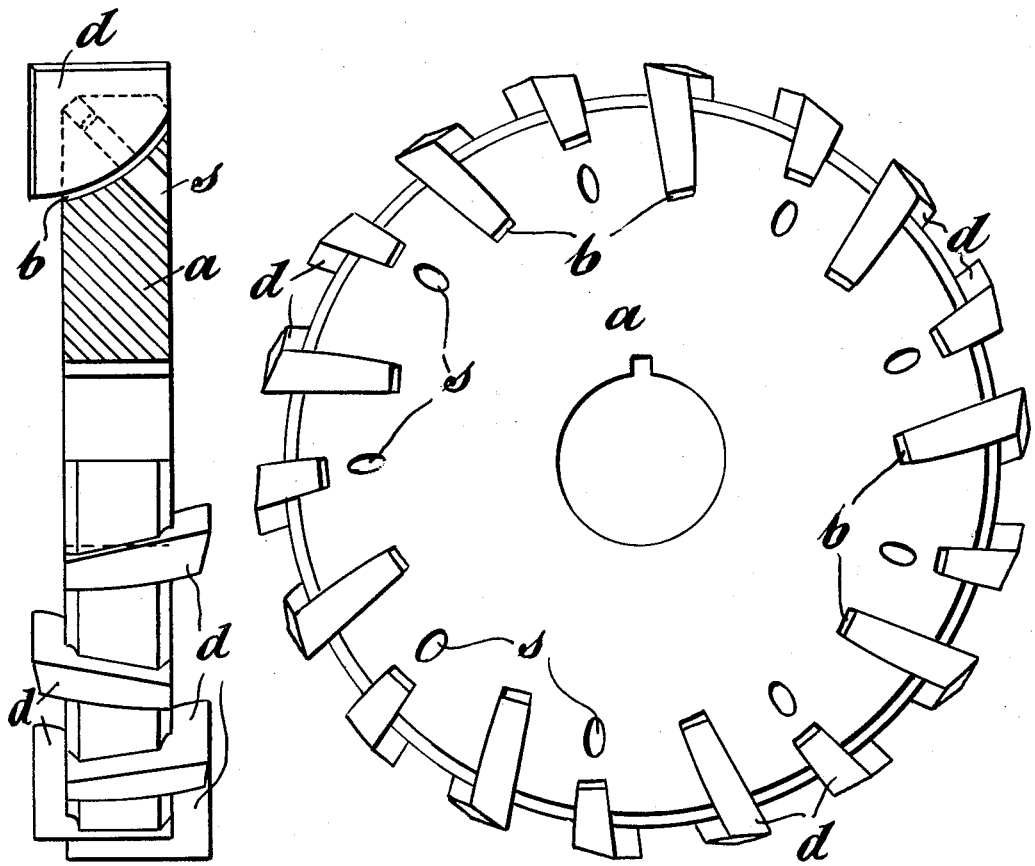

Patented Nov. 14, 1933

1,935,069

UNITED STATES PATENT OFFICE 1,935,069

ROTARY MILLING CUTTER AND LIKE TOOL

Herbert Stuart Walker and Ralph Miller, Birmingham, England, said Miller assignor to George Walker & Sons (Birmingham) Limited, Birmingham, England, a British Company Application May 23, 1931, Serial No. 539,592, and in Great Britain May 29, 1930

5 Claims. (Cl. 29—105)

This invention is for improvements in connection with rotary milling cutters and like tools of the inserted tooth type.

The invention refers more particularly to an improved method of securing the detachable cutting teeth in position upon the rotatable cutter body, and is designed with the object of providing a rotary milling cutter or like tool in which the teeth are adjustably mounted in the body in such a manner as to ensure complete security and rigidity during the cutting operation and to be adapted for easy and expeditious release for quick adjustment or removal when required, the cutter at the same time having a minimum of component parts.

According to the present invention each cutting tooth is fitted into a slotted socket in the cutter body in such a manner as to have a wedging engagement therein and to be adapted for simultaneous adjustment of two angularly spaced cutting edges, at one and the same operation, by pressure of a movable bar or instrument upon an inner edge of the tooth. Preferably the tooth has a slightly convex inwardly tapering back, of a segmental conical or like formation, the taper being disposed obliquely or diagonally of the tooth so as to secure the tooth against direct longitudinal or transverse movement relative to the cutter body and to ensure insertion of the tooth at the proper angle for obtaining correct cutting position, which retaining and guiding actions are preferably assisted by means of a loose auxiliary guide pin associated with the tooth and its containing socket.

In order that the invention may be clearly understood and readily carried into practice, reference may be had to the appended explanatory drawings, in which:—

Figure 1 is a half-sectional side elevation, and Figure 2 is a front elevation, of an inserted-tooth facing head constructed in accordance with the invention.

Figures 3 and 4 are corresponding views of an inserted-tooth side and face cutter in accordance with the invention.

Figure 5 is a fragmentary view in perspective illustrating the method of assembling a tooth in the cutter body, the view being taken from the face side of the tooth.

Figure 6 is a similar view taken from the back of the tooth.

In one method of carrying the invention into effect, as illustrated in Figures 1, 2, 5, and 6, the cutter body $a$ is of substantially cylindrical form and is provided in its end face and peripheral wall with a series of circumferentially spaced slotted sockets $b$ of substantially triangular form disposed obliquely therein in more or less tangential relation to the axial bore $c$ of the body. Each socket $b$ is fitted with a cutting tooth $d$ which projects facially and peripherally from the cutter body $a$, each tooth $d$ being of corresponding substantially triangular form but having its inner edge $e$ of convex arcuate form, the two straight sides of the tooth constituting a pair of angularly spaced cutting faces $f$ and $g$ each of which has a straight cutting edge $h$ and a shallow convex rear edge $i$, and this formation being obtained by making the front face $j$ of the tooth flat and the back $k$ of segmental conical form so as to have a shallow convexity which tapers inwardly in an oblique or diagonal direction relative to the cutting faces $f$ and $g$. Each slotted socket $b$ in the cutter body has correspondingly a flat face $l$ and a diagonally tapering conically concave back $m$ so as to be complementary to the cutting tooth $d$, and each socket $b$ is associated with a cylindrical hole $n$ bored obliquely through the cutter body at the base of the socket, this hole $n$ being adapted for accommodation of a tapered bar or like instrument by which a tangential wedging and releasing pressure can be applied to the convexly curved inner edge $e$ of the tooth. An auxiliary guide pin $o$ is associated with the tooth $d$ and its containing socket $b$, this pin $o$ being located obliquely or diagonally in relation to the cutting faces $f$ and $g$ of the tooth, and being accommodated loosely in complementary semicylindrical grooves $p$ and $q$ provided in the flat front faces $j$ and $l$ of the tooth $d$ and socket $b$ respectively.

It will be seen that the cutting tooth $d$, by reason of its rear facial curvature and of its oblique or diagonal taper, and by reason of the auxiliary guide pin $o$, can only be inserted in an oblique direction relative to the axis of the cutter body, and that the tooth when thus inserted is securely wedged in such a manner as to avoid displacement either longitudinally or transversely of the cutter body, whilst it will further be seen that by the use of the releasing bar or instrument engageable tangentially with the convex inner edge $e$ of the tooth, a simultaneous adjustment of the cutting tooth in both directions is obtained at one operation, these adjustments being regulated by the use of the usual thin copper shim $r$ which may be inserted between the convex back $k$ of the cutting tooth and the concave back $m$ of the slotted socket $b$.

In another method of carrying the invention into effect, as illustrated in Figures 3 and 4, the construction and operation are substantially the same as in the example already described, except that the cutting teeth $d$ project alternately from opposite faces of the cutter body $a$ so as to be adapted for cutting both peripherally and on both sides, and that in this case the adjusting pressure of the releasing bar or instrument is applied radially instead of tangentially to the cutting tooth $d$ by way of a hole $s$ bored obliquely into the cutter body $a$ in normal intersecting relation to the base of the slotted socket $b$.

We claim:

1. A rotary cutting tool of the inserted tooth type comprising a rotatable body member having a slot opening through the side and one end thereof, and a tooth disposed within said slot and having substantially right angularly related straight cutting edges exposed at the side and the end of the body member, respectively, said slot being of greatest width at the junction of the side and the end faces of the body member and tapering inwardly in width both longitudinally of the axis of rotation and radially relative to the body member, the tooth being correspondingly tapered in thickness, whereby pressure exerted against either cutting edge of the tooth is effective to wedge the tooth tightly into the slot.

2. A rotary cutting tool of the inserted tooth type comprising a rotatable body member having a slot opening through the side and one end thereof, and a tooth disposed within said slot and having substantially right angularly related straight cutting edges exposed at the side and the end of the body member, respectively, said slot being of greatest width at the junction of the side and the end faces of the body member and tapering inwardly in width both longitudinally of the axis of rotation and radially relative to the body member, the tooth being correspondingly tapered in thickness, whereby pressure exerted against either cutting edge of the tooth is effective to wedge the tooth tightly into the slot, and means limiting the tooth to movement relative to the body member in a line bisecting the angle formed between the straight cutting edges thereof.

3. A rotary cutting tool as set forth in claim 2 in which the tooth holding means comprises a pin seated in alined grooves in a side of the tooth and in a wall of the body member defining one side of the slot, respectively.

4. A rotary cutting tool as set forth in claim 1 in which the inner edge of the tooth extends in a convex curve between the inner ends of the two cutting edges thereof and in which the bottom of the slot extends at substantially right angles to a line bisecting the angle formed between the end and the side faces of the body member, whereby an implement wedged between the inner edge of the tooth and the bottom of the slot is effective to adjust the tooth outwardly both radially and longitudinally relative to the body member.

5. In a rotary cutting tool, a rotary tool body having a slot, and a cutting tooth for insertion in the slot of said body, said tooth of said tool, having angularly spaced cutting faces, a flat front face, an arcuate inner edge and a segmental conical back tapering inwardly in a diagonal direction relative to the cutting faces.

HERBERT STUART WALKER.
RALPH MILLER.